(12) United States Patent
Ohm et al.

(10) Patent No.: US 10,486,757 B2
(45) Date of Patent: Nov. 26, 2019

(54) UNMANNED GROUND VEHICLE TRACK SYSTEMS

(71) Applicant: iRobot Defense Holdings, Inc., Chelmsford, MA (US)

(72) Inventors: Timothy R. Ohm, Grover Beach, CA (US); Carl H. Vonnegut, Newton, MA (US)

(73) Assignee: Flir Detection, Inc., Stillwater, OK (US)

( * ) Notice: Subject to any disclaimer, the term of this patent is extended or adjusted under 35 U.S.C. 154(b) by 165 days.

(21) Appl. No.: 15/688,287

(22) Filed: Aug. 28, 2017

(65) Prior Publication Data

US 2018/0093723 A1 Apr. 5, 2018

Related U.S. Application Data

(60) Provisional application No. 62/379,997, filed on Aug. 26, 2016.

(51) Int. Cl.
| | |
|---|---|
| *B62D 55/065* | (2006.01) |
| *B62D 55/075* | (2006.01) |
| *B62D 55/26* | (2006.01) |
| *B62D 55/24* | (2006.01) |
| *B62D 55/12* | (2006.01) |

(52) U.S. Cl.
CPC ......... *B62D 55/065* (2013.01); *B62D 55/075* (2013.01); *B62D 55/24* (2013.01); *B62D 55/244* (2013.01); *B62D 55/26* (2013.01); *B62D 55/12* (2013.01)

(58) Field of Classification Search
CPC .... B62D 55/065; B62D 55/075; B62D 55/24; B62D 55/244; B62D 55/26
See application file for complete search history.

(56) References Cited

U.S. PATENT DOCUMENTS

| | | | | |
|---|---|---|---|---|
| 2,369,130 | A * | 2/1945 | Benson | B62D 55/244 |
| | | | | 305/189 |
| 2,625,229 | A * | 1/1953 | Voorhees | A63C 5/085 |
| | | | | 180/181 |
| 3,767,275 | A * | 10/1973 | Russ, Sr. | B62D 55/244 |
| | | | | 305/167 |
| 4,470,641 | A * | 9/1984 | Swarthout | B62D 55/28 |
| | | | | 305/189 |

(Continued)

*Primary Examiner* — Joseph M Rocca
*Assistant Examiner* — Michael R Stabley
(74) *Attorney, Agent, or Firm* — Jenkins, Wilson, Taylor & Hunt, P.A.

(57) ABSTRACT

This specification describes unmanned ground vehicle track systems. In some examples, an unmanned ground vehicle includes a frame having right and left sides and right and left track assemblies, each track assembly being coupled to a corresponding side of the frame in parallel with the other track assembly. Each track assembly includes a drive pulley coupled to the corresponding side of the frame and a track including a continuous flexible belt supported by the drive pulley. The track includes an interior surface engaged with the drive pulley and an exterior surface opposite the interior surface, and the exterior surface of the track includes a plurality of flexible bristles. The unmanned ground vehicle includes one or more drive motors configured to drive the drive pulleys of the right and left track assemblies.

23 Claims, 11 Drawing Sheets

(56) References Cited

U.S. PATENT DOCUMENTS

| | | | | |
|---|---|---|---|---|
| 4,483,407 A | * | 11/1984 | Iwamoto | B62B 5/02 |
| | | | | 180/6.54 |
| 5,466,056 A | * | 11/1995 | James | B62D 55/28 |
| | | | | 305/162 |
| 6,263,989 B1 | * | 7/2001 | Won | B25J 5/005 |
| | | | | 180/8.7 |
| 6,615,885 B1 | | 9/2003 | Ohm | |
| 7,597,162 B2 | | 10/2009 | Won | |
| 7,654,348 B2 | | 2/2010 | Ohm et al. | |
| 8,256,542 B2 | * | 9/2012 | Couture | B25J 5/005 |
| | | | | 180/8.7 |
| 8,644,991 B2 | * | 2/2014 | Ohm | G05D 1/0246 |
| | | | | 180/9.3 |
| 8,800,107 B2 | * | 8/2014 | Blouin | A47L 9/0455 |
| | | | | 15/392 |
| 2007/0156286 A1 | * | 7/2007 | Yamauchi | G05D 1/0038 |
| | | | | 700/245 |
| 2008/0183332 A1 | | 7/2008 | Ohm et al. | |
| 2008/0223630 A1 | | 9/2008 | Couture et al. | |
| 2009/0314554 A1 | | 12/2009 | Couture et al. | |
| 2012/0200149 A1 | | 8/2012 | Rudakevych et al. | |

\* cited by examiner

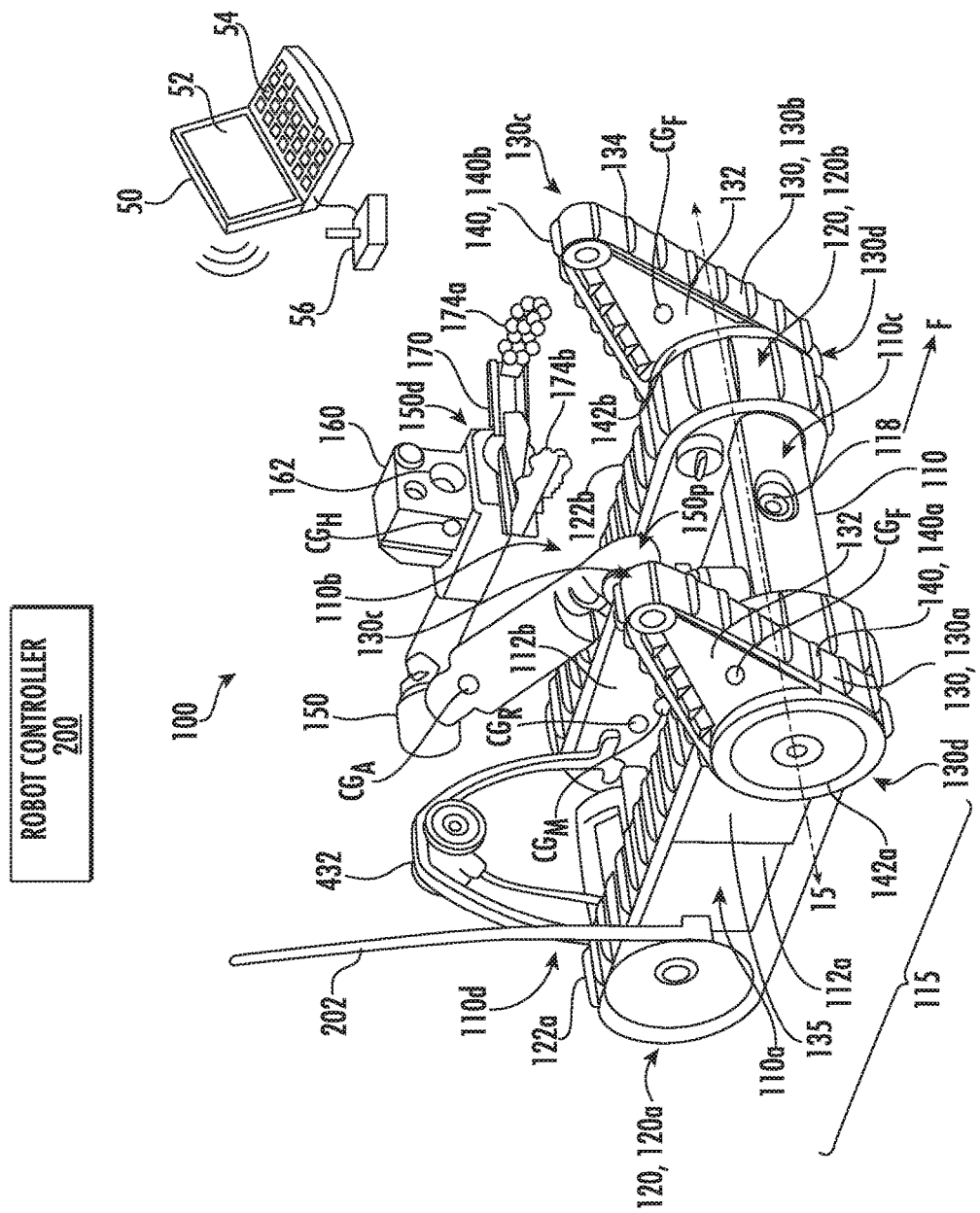

UNMANNED GROUND VEHICLE TRACK SYSTEMS

PRIORITY CLAIM

This application claims the benefit of U.S. Provisional Patent Application Ser. No. 62/379,997 filed Aug. 26, 2016, the disclosure of which is incorporated herein by reference in its entirety.

BACKGROUND

Typical existing ground vehicle track systems use evenly spaced cleats arranged radially along the outer track perimeter. The cleats on these tracks are often designed to be rigid enough to support the vehicle loads during maneuvers and climbs on varying terrain (including stair climbs). Since these cleats occur at discrete intervals that will not ordinarily match the terrain, some or all of the traction load must be supplied by a single cleat at any given time. Furthermore, with rigid cleats, any shock/vibration loads may be directly transmitted into the vehicle main wheels and/or bogie rollers. Suspension systems are therefore sometimes used to reduce the level of vibration transmitted to the vehicle chassis.

SUMMARY

This specification describes unmanned ground vehicle track systems. In some examples, an unmanned ground vehicle includes a frame having right and left sides and right and left track assemblies, each track assembly being coupled to a corresponding side of the frame in parallel with the other track assembly. Each track assembly includes a drive pulley coupled to the corresponding side of the frame and a track including a continuous flexible belt supported by the drive pulley. The track includes an interior surface engaged with the drive pulley and an exterior surface opposite the interior surface, and the exterior surface of the track includes a plurality of flexible bristles. The unmanned ground vehicle includes one or more drive motors configured to drive the drive pulleys of the right and left track assemblies.

BRIEF DESCRIPTION OF THE DRAWINGS

FIG. 1 illustrates an example mobile robotic vehicle that may be used as an unmanned ground vehicle capable of conducting operations in various environments;

DETAILED DESCRIPTION

Figure 2A:
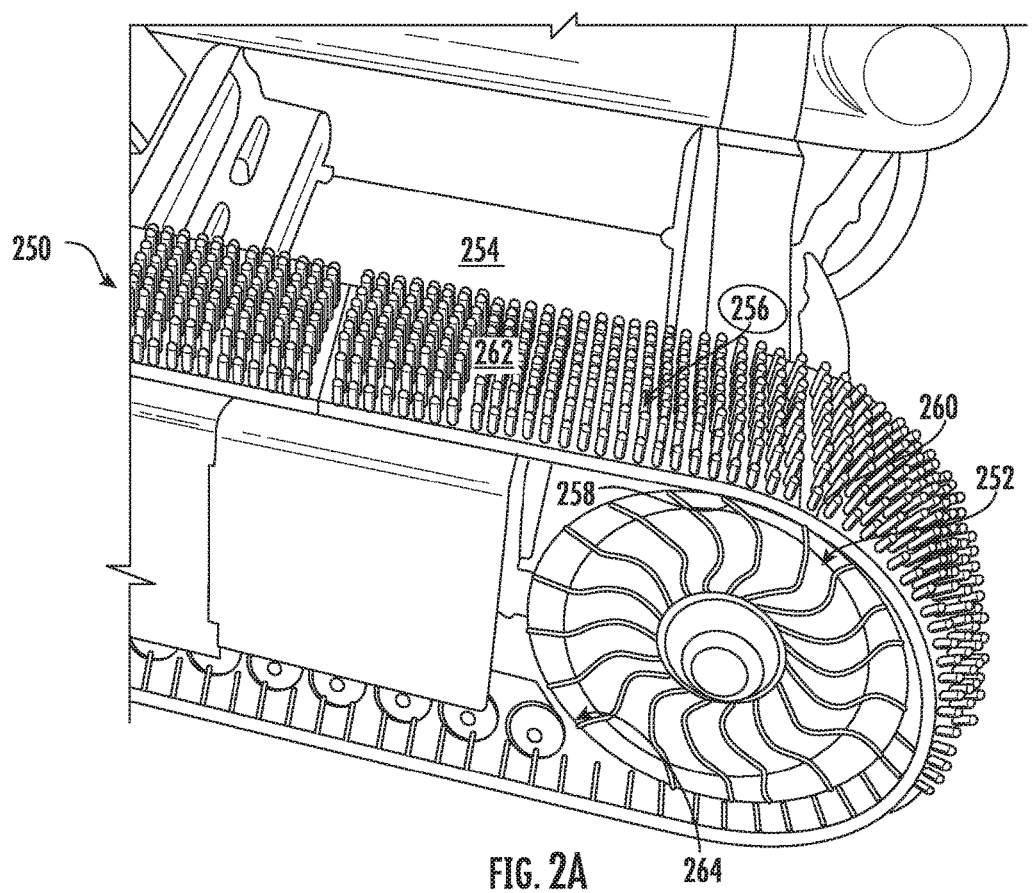
FIGS. 2A-E illustrate an example track assembly for the robot.

FIG. 1 illustrates an example mobile robotic vehicle 100 that may be used as an unmanned ground vehicle capable of conducting operations in various environments such as urban terrain, tunnels, sewers, and caves. Moreover, the robot 100 may aid in the performance of urban Intelligence, Surveillance, and Reconnaissance (ISR) missions, chemical/Toxic Industrial Chemicals (TIC), Toxic Industrial Materials (TIM), and reconnaissance. Although the robot 100 shown includes a track driven drive system having flippers, other mobility platforms, configurations and morphologies are possible as well, such as wheel driven platforms, crawling or walking platforms, and so on.

The robot 100 can be designed to move about in a variety of environments, including an urban environment of buildings (including staircases), streets, underground tunnels, building ruble, and in vegetation, such as through grass and around trees. The robot 100 may have a variety of features which provide robust operation in these environments, including impact resistance, tolerance of debris entrainment, and invertible operability.

The robot 100 includes a main body 110 (or chassis) having a drive system 115 supported by the main body 110. The main body 110 has right and left sides 110a, 110b as well as a leading end 110c, a trailing end 110d and a center of gravity $CG_M$. In the example shown, the main body 110 includes right and left rigid side plates 112a, 112b disposed parallel to each other. At least one transverse support 114 rigidly couples the right side place 112a to the left side plate 112b. The rigid components are designed for strength and low weight and can be made from a material such as 7075-T6 aluminum. Alternative versions of the robot 100 can use other materials, such as other lightweight metals, polymers, or composite materials. The robot 100 may be electrically powered (e.g. by a bank of standard military BB-2590 replaceable and rechargeable lithium-ion batteries).

In some implementations, the drive system 115 includes right and left driven track assemblies 120a, 120b (also referred to as the main tracks 120) mounted on the corresponding right and left sides 110a, 110b of the main body 110 and having right and left driven tracks 122a, 122b respectively. Each driven track 122a, 122b is trained about a corresponding front wheel, which rotates about a drive axis 15. FIG. 1 shows the driven tracks 122a, 122b having cleats arranged radially along the outer track perimeter; however, the robot 100 can alternatively have tracks as illustrated in FIGS. 2A-E and 3A-E.

The robot 100 includes at least one extendable flipper 130 mounted on the main body 110. In some examples, the robot 100 is configured to releasably receive one or more flippers 130 onto the main body 110 (e.g., onto and concentric with one of the front drive wheels at the leading end 110 c of the main body 110). As shown in FIG. 1, the robot 100 includes right and left flippers 130a, 130b, which are shown in an extended configuration extending beyond the front or leading end 110c of the main body 110.

The flippers 130, 130a, 130b each have a distal end 130c, a pivot end 130d, and a flipper center of gravity $CG_F$ between the distal and pivot ends 130c, 130d. Each flipper 130, 130a, 130b pivots about the drive axis 15 near the leading end 110c of the main body 110. Moreover, each flipper 130, 130a, 130b may have a driven flipper track 140, 140a, 140b trained about flipper drive wheel 142a, 142b, which is driven about the drive axis 15 at the pivot end 130d of the flipper 130a, 130b.

In the example shown, flipper track supports 134 disposed on a flipper side plate 132 of the flipper 130 support the corresponding flipper track 140. In some implementations, the flippers 130, 130a, 130b can be rotated in unison in a continuous 360 degrees between a stowed position, in which the flippers 130 a, 130b are next to the right and left side plates 112a, 112b of the main body 110, and at least one deployed position, in which the flippers 130a, 130b are pivoted at an angle with respect to the main tracks 122a, 122b. The center of gravity $CG_R$ of the robot 100 can be contained within an envelope of the 360 degree rotation of the flippers 130a, 130b.

In some implementations, the flipper side plates 132 of the respective right and left flippers 130a, 130b are rigidly coupled to one another through the articulator shaft to move together in unison. In other implementations, the flippers 130a, 130b pivot independently of each other. The combination of main tracks assemblies 120a, 120b and flippers 130, 130a, 130b provide an extendable drive base length to negotiate gaps in a supporting surface. In some examples, the right main tack 122a and the right flipper track 140a are driven in unison and the left main tack 122b and the left flipper track 140b are driven in unison to provide a skid steer drive system.

The main body 110 may include one or more cameras 118 disposed near the leading end 110c of the main body 110 and may be positioned to have a field of view directed forward and/or upward. The camera(s) 118 may capture images and/or video of the robot environment for navigating the robot 100 and/or performing specialized tasks, such as maneuvering through tunnels, sewers, and caves, etc.

The robot 100 may include one or more robotic manipulator arms 150 (e.g., articulated arms) each having a pivot end 150p pivotally coupled to the main body 110 and a distal end 150d that may be configured to receive a head 160 or a gripper 170 or both. The arm 150 may be coupled to the main body 110 in a manner that allows the arm 150 to be stowed along the main body 110 in a compact configuration and pivot away from main body 110 to allow a wider range of CG-shifting, for example, to negotiate obstacles.

As shown in FIG. 1, a head 160 and a gripper 170 are mounted on the distal end 150d of the arm 150. The arm 150 has an arm center of gravity $CG_A$ and the head 160 has a center of gravity $CG_H$. The head 160 may include a camera 162 (e.g., visible light and/or infrared camera), radar, LIDAR (Light Detection And Ranging, which can entail optical remote sensing that measures properties of scattered light to find range and/or other information of a distant target), LADAR (Laser Detection and Ranging), a communication device (radio frequency, wireless, etc.), and/or other components.

To achieve reliable and robust autonomous or semi-autonomous movement, the robot 100 may include a sensor system having several different types of sensors. The sensors can be used in conjunction with one another to create a perception of the robot's environment (i.e., a local sensory perception) sufficient to allow a control system for the robot 100 to determine actions to take in that environment. The sensor system 400 may include one or more types of sensors supported by the robot body 110, which may include obstacle detection obstacle avoidance (ODOA) sensors, communication sensors, navigation sensors, and so on.

For example, these sensors may include proximity sensors, contact sensors, cameras (e.g., volumetric point cloud imaging, three-dimensional (3D) imaging or depth map sensors, visible light camera and/or infrared camera), sonar (e.g., ranging sonar and/or imaging sonar), radar, LIDAR (Light Detection And Ranging, which can entail optical remote sensing that measures properties of scattered light to find range and/or other information of a distant target), LADAR (Laser Detection and Ranging), laser scanner, ultrasound sensor, and so on.

In some implementations, the robot 100 includes a robot controller 200 in communication with the drive system 115, the arm 150, and any head(s) 160 or gripper(s) 170 mounted on the arm 150. The robot controller 200 may issue drive commands to one or more motors driving the main tracks 120 and the flipper tracks 140. Moreover, the robot controller 200 may issue rotational commands to a flipper motor 135 to rotate the flippers 130 about the drive axis 15. The robot controller 200 may include one or more computer processors and associated memory systems, and the robot controller 200 can be mounted in any appropriate location on the robot 100.

The robot controller 200 may be implemented in hardware, software, firmware, or combinations of hardware, software and/or firmware. In some examples, the robot controller 200 may be implemented using a non-transitory computer readable medium storing computer executable instructions that when executed by one or more processors of a computer cause the computer to perform operations. Computer readable media may include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the robot controller 200 may be located on a single device or computing platform or may be distributed across multiple devices or computing platforms.

The proximity sensors may be converging infrared (IR) emitter-sensor elements, sonar sensors, ultrasonic sensors, and/or imaging sensors (e.g., 3D depth map image sensors) that provide a signal to a robot controller 200 when an object is within a given range of the robot 100. The robot controller 200 (executing a control system) may execute behaviors that cause the robot 100 to take an action, such as changing its direction of travel, when an obstacle is detected.

In some examples, the sensor system includes an inertial measurement unit (IMU) in communication with the robot controller 200 to measure and monitor a moment of inertia of the robot 100 with respect to the overall center of gravity CGR of the robot 100. The robot controller 200 may monitor any deviation in feedback from the IMU from a threshold signal corresponding to normal unencumbered operation. For example, if the robot begins to pitch away from an upright position, it may be "clothes lined" or otherwise impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the robot controller 200 may take into account a moment of inertia of the robot 100 from its overall center of gravity CGR to prevent robot tipping. The robot controller 200 may use a model of its pose, including its current moment of inertia. When payloads are supported, the robot controller 200 may measure a load impact on the overall center of gravity CGR and monitor movement of the robot moment of inertia. If this is not possible, the robot controller 200 may apply a test torque command to the drive system 115 and measure actual linear and angular acceleration of the robot using the IMU, in order to experimentally determine safe limits.

The robot controller 200 may include a communication system 202, which includes, for example, a radio to communicate with the remote operator control unit (OCU) 50 to receive commands and issue status and/or navigation information. The OCU 50 may include a display 52 (e.g., LCD or touch screen), a keyboard 54, and one or more auxiliary user inputs 56, such a joystick or gaming unit. The OCU 50 may also include a computing processor and memory in communication. The processor is programmed for rendering graphics on the display 52. The OCU 50 allows an operator or user to control the robot 100 from a distance. In some examples, the user can select different levels of human control over the robot 100, ranging from a teleoperation mode, in which the user directly controls the motors and actuators on the robot 100, to autonomous operation, in which the user passes higher-level commands to the robot 100. In partially autonomous operation, the robot 100 can perform tasks such as following a perimeter or wall, recovering from getting stuck in an opening or due to high centering on an obstruction, evading a moving object, or seeking light.

FIGS. 2A-E illustrate an example track assembly 250 for the robot 100. The robot 100 can include right and left track assemblies, each track assembly being coupled to a corresponding side of the frame in parallel with the other track assembly.

FIG. 2A shows a side view of the track assembly 250. The track assembly 250 includes at least one pulley 252 (which can be referred to as a drive wheel) coupled to a robot frame 254. For example, the track assembly 250 can include a drive pulley driven by a drive motor and one or more idler pulleys. The pulley 252 supports a track 256. The track 256 is a continuous flexible belt that wraps around the pulley 252 and supports the robot 100 by contacting the ground. The track 256 can be further supported by other pulleys, e.g., an idler pulley.

The track 256 has an interior surface 258 engaged with the pulley 252 and an exterior surface 260 opposite the interior surface 258. Different portions of the interior surface 258 engage the pulley 252 as the track 256 is driven. The exterior surface 260 has flexible bristles 262 extending away from the exterior surface 262. The track assembly 250 can include a row 264 of bogie rollers engaged with the interior surface 258 of the track 256 and recessed with the track 256 to be flush with the pulley 252.

Figure 2B:
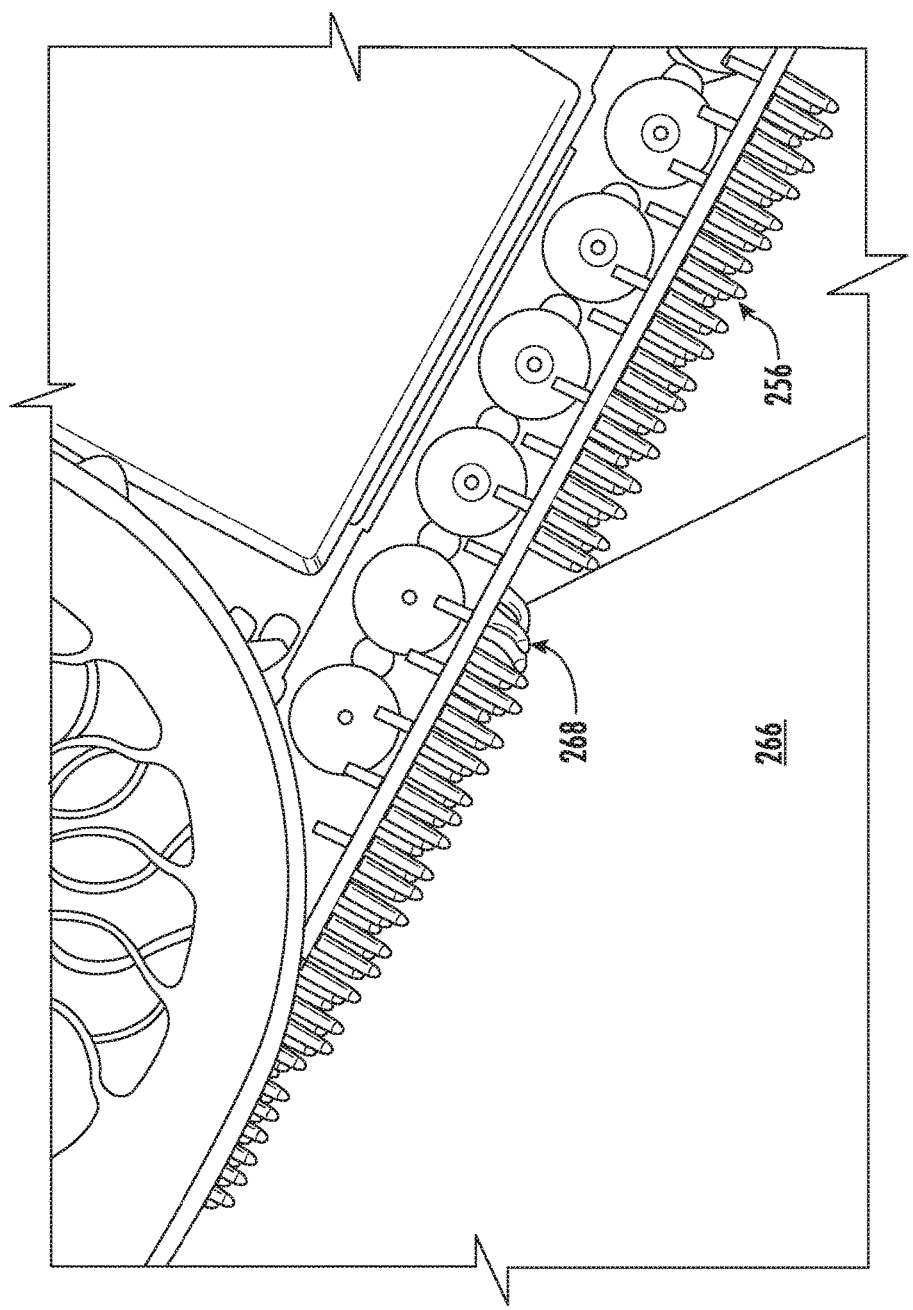
Figure 2C:
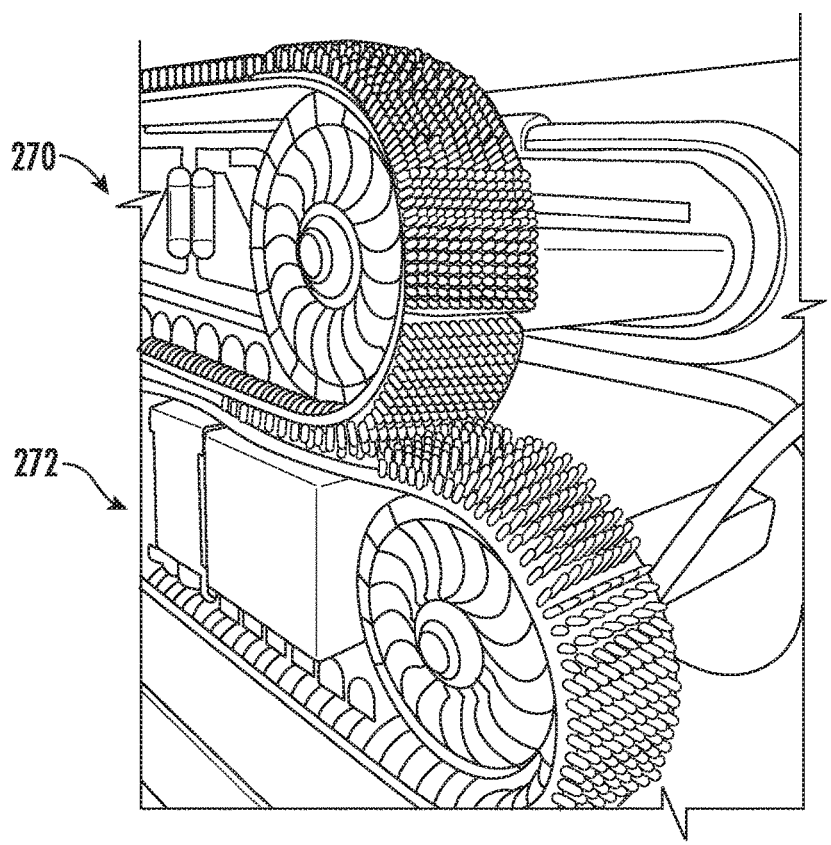

FIG. 2B shows the track 256 making contact with a stair 266 and generating traction between some of the flexible bristles 268 and the stair 266 to surmount the stair 266. FIG. 2C shows two example track assemblies 270 and 272 each having a different density of flexible bristles. The density of flexible bristles for a track is the number of bristles disposed over the area of the exterior surface of the track.

Figure 2D:
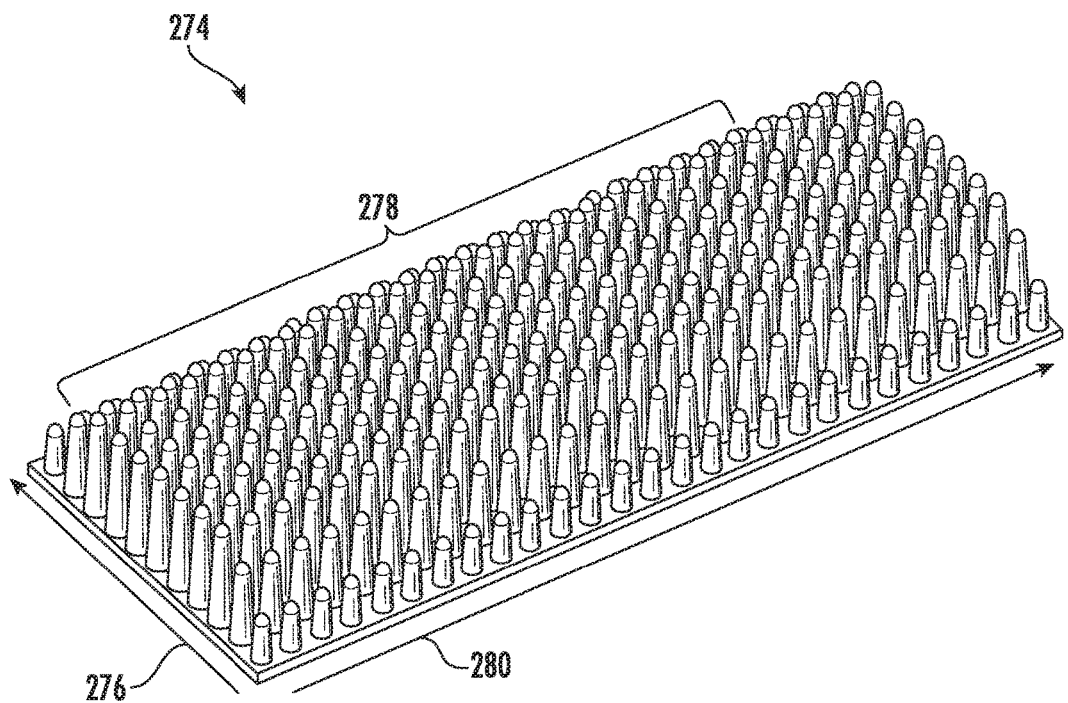

FIG. 2D shows an example track 274 having rows of flexible bristles. The track 274 has a track width in a lateral direction 276 extending between right and left sides of a robot frame. The track 274 includes rows of flexible bristles each extending across the track width in the lateral direction 276. Within each row, a height of the flexible bristles tapers from a center of the row to left and right edges of the row. For example, the height may be uniform for a number of bristles in the center of the row and then smaller for a number of bristles on the left and right edges of the row.

The rows are spaced apart in a longitudinal direction 280 perpendicular to the lateral direction 276, forming an array of flexible bristles. For example, the flexible bristles of each row can be spaced apart evenly within the row, and each row can be evenly spaced apart from adjacent rows. In some examples, a subset of the rows are not spaced apart evenly to accommodate manufacturing artifacts. In some examples, the flexible bristles are spaced apart densely so that the array of flexible bristles covers, in aggregate, more than 50% of the area of the exterior surface of the track, or more than 80% or 90% of the area. For example, the array of flexible bristles can cover from 50-90% of the exterior surface area of the track.

Figure 2E:
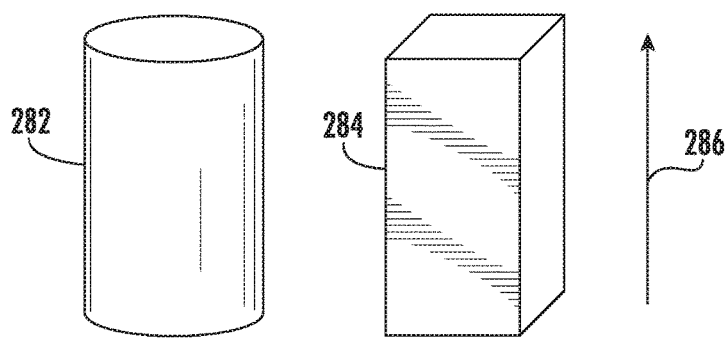

FIG. 2E illustrates two example flexible bristles 282 and 284. The first example flexible bristle 282 is cylindrical and the second example flexible bristle 284 is rectangular. In general, the flexible bristles are protrusions extending away from the track and can have any appropriate shape and typically have a height 286 extending away from the exterior surface of the track that is greater than the length or width or both over the exterior surface of the track.

For example, the flexible bristles can taper in height as the flexible bristles extend away from the track. In some examples, the flexible bristles have a bristle width that is less than half the track width or less than a tenth of the track width. In some examples, the flexible bristles are formed of a molded thermoplastic or thermoset elastomer material.

The flexible bristles 262 can be useful, e.g., to support the vehicle as a group but locally deform over concentrated pressure points. An unmanned ground vehicle using track assemblies with the flexible bristles 262 can have some or all of the following advantages compared to conventional track systems with cleats:

Traction: Traditional "cleated" tracks typically only supply traction at each discrete cleat, thus on rough terrain in reality only one cleat typically carries load at any given time. When this "loaded cleat" slips or lifts off the ground, the track inherently slips until the next cleat engages. An example of this occurs during stair climbing. Given that cleated tracks typically do not have the cleat spacing exactly match the step spacing, this means that only a single cleat (on each side of the vehicle) must carry the entire vehicle load at a given time. As the vehicle transitions up the steps, at some point this "loaded" cleat must slip, thus the vehicle begins to slide down the stairs until the next cleat hopefully regains traction (and this cycle then repeats). In the best case, this leads to the vehicle "yawing" back and forth as the cleats constantly cycle (noting that this phasing is not "in synch" on each side of the vehicle); in the worst case it leads to the vehicle losing traction altogether and slipping partway (or all the way) down the stairs. The track assemblies illustrated in FIGS. 2A-E can remedy this situation by distributing traction to multiple steps simultaneously, thus eliminating the "cyclic transition" that needs to occur with a cleated track.

Suspension: A traditional track does not have any compressive compliance thus a separate "suspension system" is often added to smoothly negotiate rough terrain (such as on a military tank). The track assemblies illustrated in FIGS. 2A-E can avoid a separate suspension system by adding compressive, radial compliance to the track itself, thus greatly simplifying the vehicle design. For a tele-operated unmanned vehicle, this also results in a significant reduction in "camera shake" thus providing improved situational awareness for the vehicle operator.

Shock Absorption: A traditional track is typically quite stiff across its thickness thus it primarily just transfers shock loads directly into the next component (such as the wheels or bogies); this happens not only whenever a system is dropped/thrown, but also whenever the vehicle encounters impacts during the course of driving. Even in the case where impact occurs directly on an individual cleat (where the compliance can be highest), this load can still be concentrated enough to locally damage the wheel (e.g., by cracking the rim). The track assemblies illustrated in FIGS. 2A-E can remedy this by both absorbing much more energy in the track itself as well as distributing the load to a much larger area. A prime example of where this would help is when a traditionally tracked vehicle transitions off of stairs to flat floor; the existing systems "slams" against the ground whereas the bristle-track greatly dampens this transition.

Bogie Wheel Supports: When using tracks with individual cleats, it may be important that bogie rollers (or track slides) be used that actually push the track below the tangential point of the wheels. If this is not done, the cleats act as "rumble strips" (as they pass between the wheel and ground) that will cause the system to go more unstable as speed increases (resulting in a very rough ride). This means that these bogies need to carry the entire weight of the system when driving on level ground; this can lead to overheating of these very small bogie rollers. The bristle track eliminates these "rigid" cleats thus eliminates the primary need for such bogie rollers. This means that the bogie rollers can now be recessed back flush with the main wheels so that not nearly as much of the system weight now needs to be carried by the bogies.

Figure 3A:
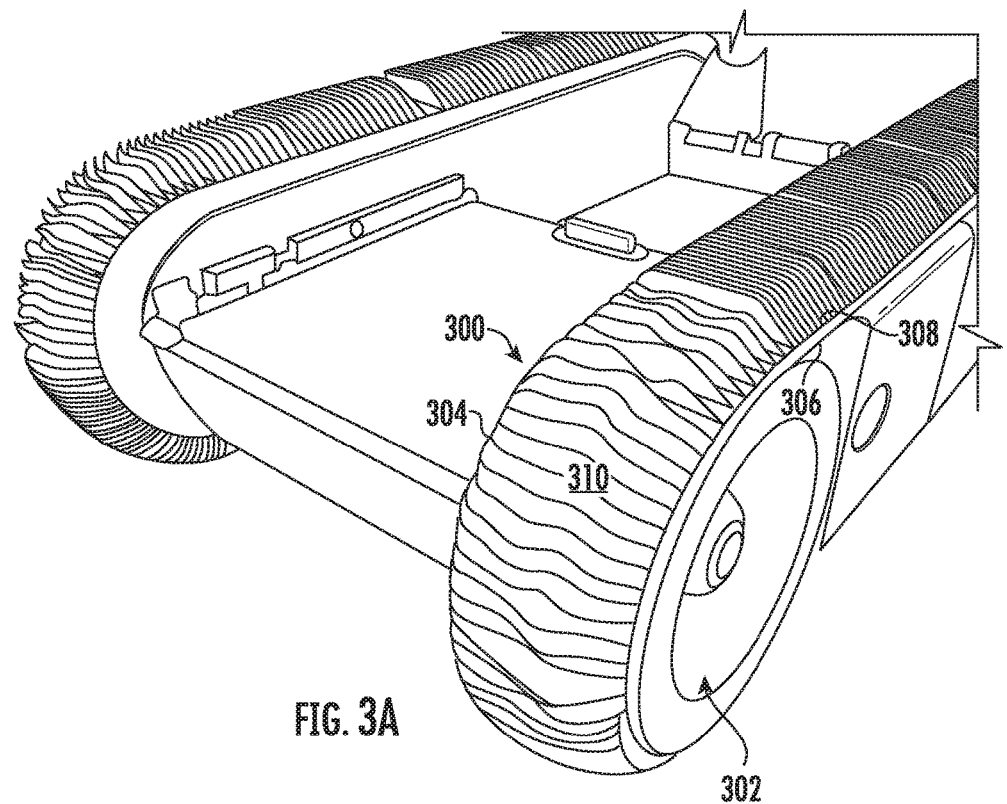
FIGS. 3A-G illustrate another example track assembly for the robot.

FIGS. 3A-E illustrate another example track assembly 300 for the robot 100. FIG. 3A shows an isometric view of the track assembly 300. The track assembly 300 includes a pulley 302 and a track 304 trained about the pulley 302. The track 304 includes an interior surface 306 engaged with the pulley 302 and an exterior surface 308 opposite the interior surface 306. The exterior surface 308 includes a number of flexible vanes 310.

Figure 3B:
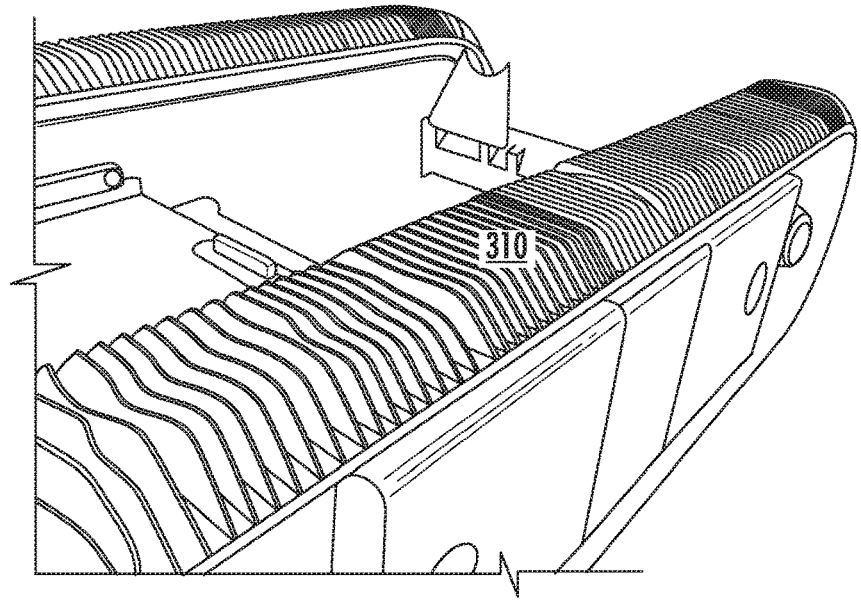
Figure 3C:
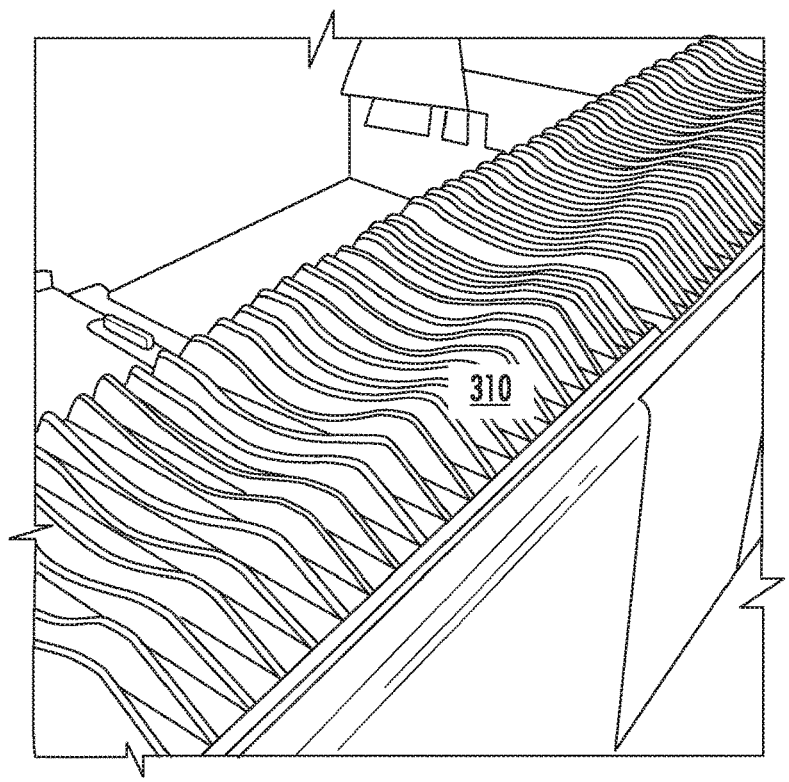
Figure 3D:
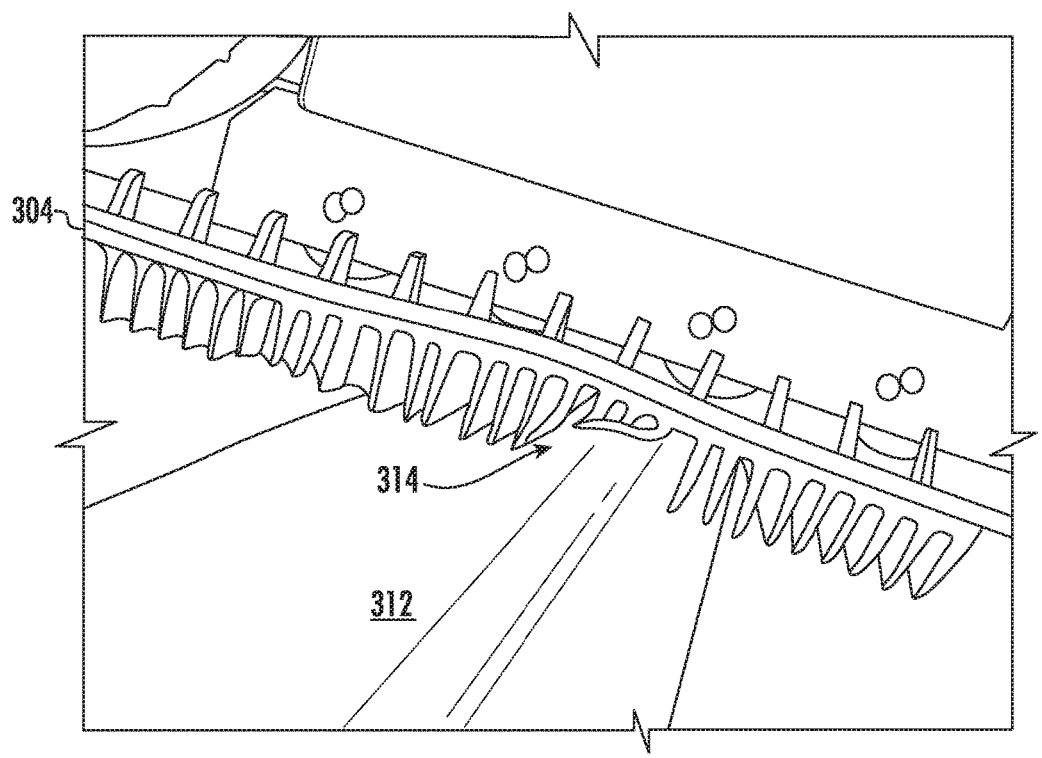

FIGS. 3B and 3C show alternate views of the flexible vanes 310. FIG. 3D shows the track 304 making contact with a stair 312 and generating traction between some of the flexible vanes 314 and the stair 312 to surmount the stair 312.

Figure 3E:
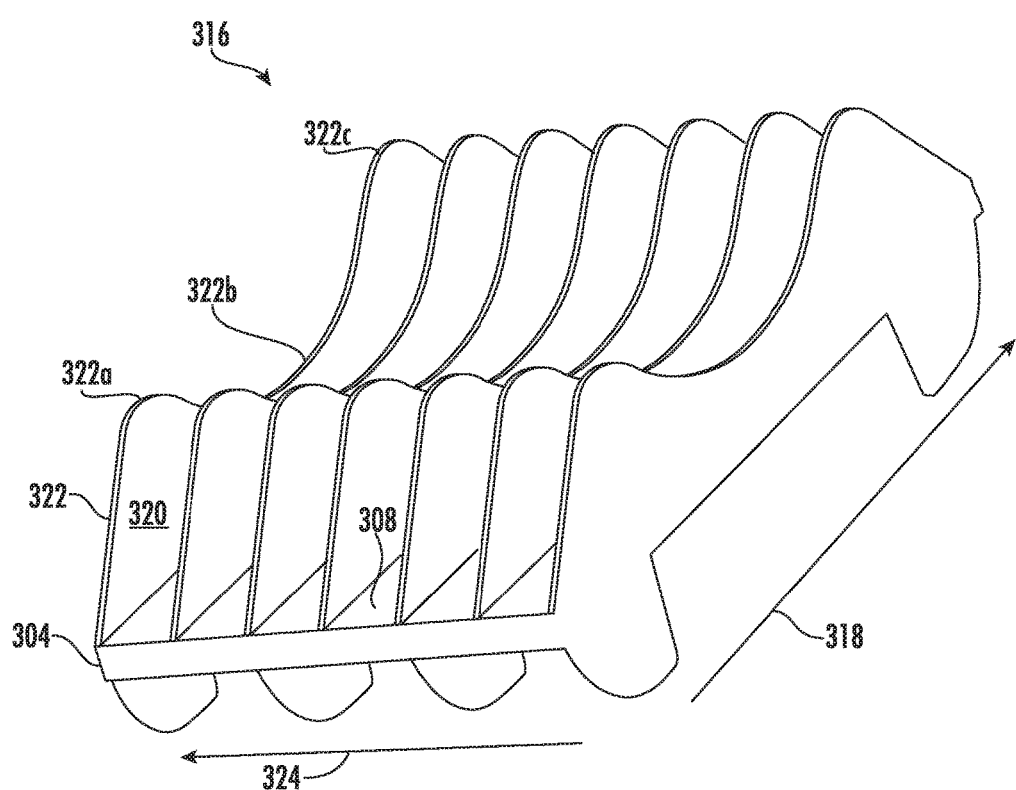

FIG. 3E shows a number of example flexible vanes 316 on the track 304. The track 304 has a track width in a lateral direction 318 extending between right and left sides of the frame. To illustrate the structure of the flexible vanes 316, consider a first flexible vane 320. The flexible vane 320 extends away from the exterior surface 308 of the track 304 and has an undulated edge 322 opposite the exterior surface 308 of the track 304. Although the edge 322 is depicted as being undulated, in some examples, the flexible vanes can have straight edges. The undulated edge 322 may result, in some cases, from deformation during the track assembly process, e.g., from heat welding.

In general, the undulated edge 322 follows a pattern that alternatively extends away from the exterior surface 308 of the track 304 and then back towards the exterior surface 308. For example, as illustrated, the undulated edge 322 follows a pattern that rises to right side peak 322a, falls to a central trough 322b, and then rises to a left side peak 322c. In some examples, the undulated edge 322 follows a pattern that curves smoothly between peaks and troughs.

In some examples, the flexible vane 320 is flexible in a longitudinal direction 324 perpendicular to the lateral direction 318. For example, the flexible vane 320 can be made from a molded thermoplastic or thermoset elastomer material. Where the width of the flexible vane 320 along the longitudinal direction 324 is smaller or much smaller (e.g., less than a tenth) than the length of the flexible vane 320 in the lateral direction 318, the flexible vane 320 can be stiff in the lateral direction 318. In some examples, the flexible vanes 316 are organized into rows along the longitudinal direction 324. The rows can be evenly spaced apart in the longitudinal direction 324, and the rows can be spaced apart by a distance, e.g., so that fiber optic cables or other cables of a certain diameter can fit between the rows.

Tracked assemblies having the flexible vanes 310 of FIGS. 3A-E can provide some or all of the advantages described above with reference to FIGS. 2A-E. In some cases, tracked assemblies having the flexible vanes 310 can provide some vehicle dynamics advantages over the bristle version in that it maintains high traction in the longitudinal direction but lowers traction in the lateral direction to allow the track to more easily slide sideways during a skid steer event. Tracked assemblies having the flexible vanes 310 can in some cases provide improved interaction with thin diameter fiber optic cable (e.g., during tethered unmanned vehicle control)—it may be less prone to entrap the fiber cable than the bristle version.

Figure 3F:
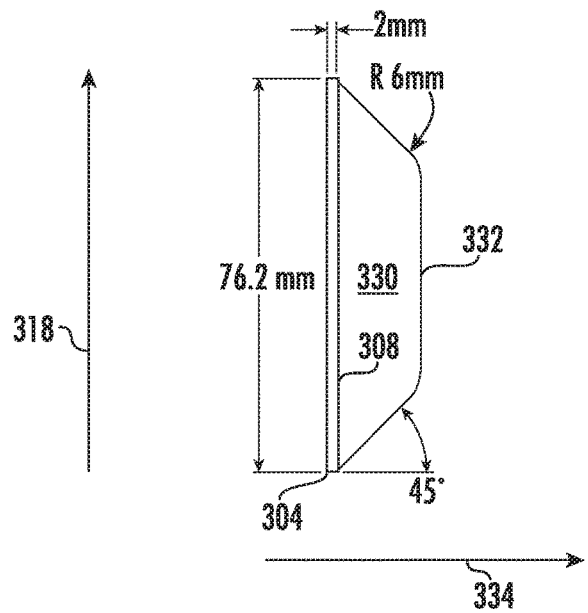
Figure 3G:
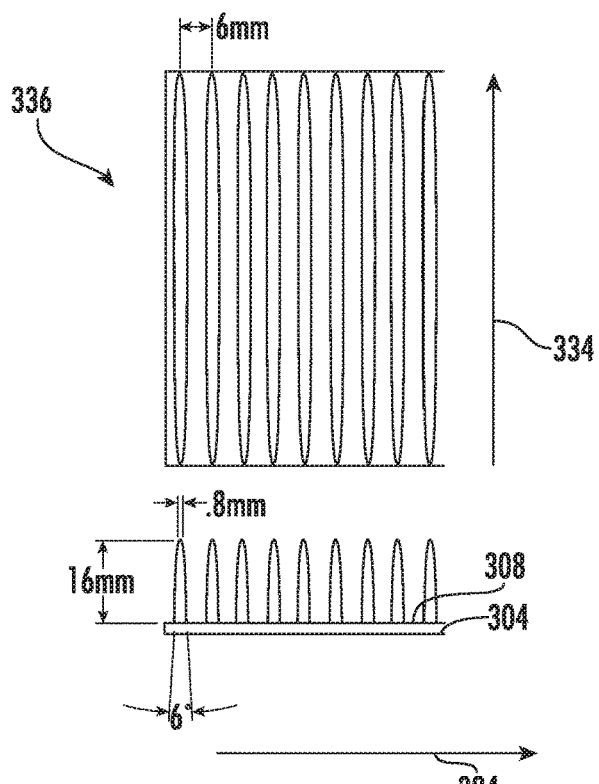

FIGS. 3F and 3G illustrate an example flexible vane 330 having a straight edge 332. FIG. 3F shows a front view of the flexible vane 330. The flexible vane 330 extends away from the exterior surface 308 of the track 304 in a vertical direction 334, and the flexible vane 330 and has an exterior edge 332 opposite the exterior surface 308 of the track 304. The edge 332 may not be completely straight in that the edge 332 can taper to right and left edges of the track 304 as shown. The edge 332 is straight in a central portion of the edge 332 although, in some cases, the edge 332 may not be perfectly straight due to manufacturing processes.

FIG. 3G shows a side view of a number of rows 336 of flexible vanes having straight edges. The rows 336 are spaced apart in the longitudinal direction 324 and have a height in the vertical direction 334. The flexible vanes have a six degree (included angle) taper from base to tip in the longitudinal direction 324. The flexible vanes can have a height of, e.g., 16 mm or 12 mm. In some examples, the vanes are configured to be flexible by virtue of having a vane height to (tip) thickness ratio from 20:1 to 8:1. Example dimensions are shown in FIGS. 3F and 3G for purposes of illustration and not for limiting the claims of this application that do not specify these dimensions.

In the tracked assemblies shown in FIGS. 2A-E and FIGS. 3A-E, the material selection and hardness of the flexible bristles and vanes can be selected based on factors specific to applications of the unmanned ground vehicle. For example, the material selection and hardness can be altered depending on vehicle size/mass, ground terrain conditions, mold-ability, and so on.

Figure 4:
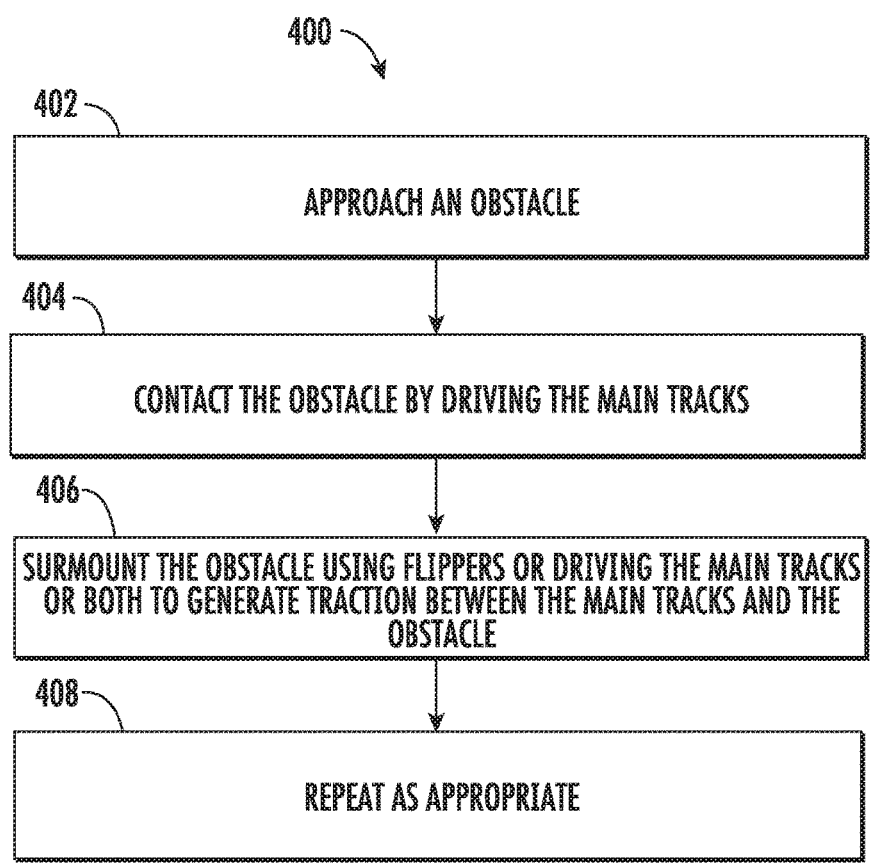
FIG. 4 is a flow chart of an example method for controlling an unmanned ground vehicle.

FIG. 4 is a flow chart of an example method 400 for controlling an unmanned ground vehicle, e.g., the robot 100 of FIG. 1 with track assemblies as shown in FIGS. 2A-E or 3A-E. The method 400 can be performed by a controller, e.g., a controller on the vehicle or a controller remote from the vehicle and in wireless communication with the vehicle. The method 400 includes executing an obstacle surmounting routine for surmounting an obstacle, e.g., a stair climbing routine or a fiber optic cable navigation routine.

The method includes 400 approaching, by the controller sending control signals to one or more drive motors, the obstacle (402). The method 400 includes contacting, by the controller sending the control signals to the drive motors and one or more flipper drive motors, the obstacle (404). The method 400 includes surmounting the obstacle using flippers or driving the main tracks or both to generate traction between the obstacle and flexible bristles or vanes on main tracks or flipper tracks of the unmanned ground vehicle (406). The method 400 includes repeating as necessary to surmount further obstacles such as a series of stairs (408).

For example, suppose that the obstacle is a stair. The controller can raise right and left flippers, drive the vehicle towards the stair using left and right main tracks to place distal ends of the flippers into contact with a front edge of the stair, and then rotate the right and left flippers to lift the unmanned ground vehicle to an angle with respect to the stair. Then the controller can drive the left and right main tracks to drive onto the stair.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An unmanned ground vehicle comprising:
   a frame having right and left sides;
   right and left track assemblies, each track assembly being coupled to a corresponding side of the frame in parallel with the other track assembly, each track assembly comprising:
      a drive pulley coupled to the corresponding side of the frame; and
      a track comprising a continuous flexible belt supported by the drive pulley, wherein the track comprises an interior surface engaged with the drive pulley and an exterior surface opposite the interior surface, and wherein the exterior surface of the track comprises a plurality of flexible bristles; and
   one or more drive motors configured to drive the drive pulleys of the right and left track assemblies;
   wherein each track has a track width in a lateral direction extending between the right and left sides, and wherein, for each track, the exterior surface of the track comprises a plurality of rows of flexible bristles each extending across the track width in the lateral direction, and wherein, for each row of flexible bristles, a height of the flexible bristles tapers from a center of the row to left and right edges of the row.

2. The unmanned ground vehicle of claim 1, wherein each flexible bristle has a bristle width in the lateral direction, and wherein the bristle width is less than half the track width.

3. The unmanned ground vehicle of claim 1, wherein the plurality of rows are spaced apart around the exterior surface of the track in a longitudinal direction perpendicular to the lateral direction, forming an array of flexible bristles around the continuous flexible belt of the track.

4. The unmanned ground vehicle of claim 3, wherein the flexible bristles of each row are spaced apart evenly within the row, and wherein each row is evenly spaced apart from adjacent rows.

5. The unmanned ground vehicle of claim 3, wherein the flexible bristles are spaced apart densely so that the array of flexible bristles covers, in aggregate, more than 50% of the area of the exterior surface of the track.

6. The unmanned ground vehicle of claim 1, wherein each flexible bristle comprises a molded thermoplastic or thermoset elastomer material.

7. The unmanned ground vehicle of claim 1, wherein, for each track, each flexible bristle comprises a protrusion extending away from the exterior surface of the track.

8. The unmanned ground vehicle of claim 7, wherein the protrusion of each flexible bristle is rectangular or cylindrical.

9. The unmanned ground vehicle of claim 7, wherein the protrusion of each flexible bristle has a height extending away from the exterior surface of the track and a length and a width over the exterior surface of the track, and wherein the height is greater than the length or the width or both.

10. The unmanned ground vehicle of claim 1, wherein each track has a track width in a lateral direction extending between the right and left sides, wherein each drive pulley has a pulley width in the lateral direction shorter than the track width, and wherein, for each track assembly, the track assembly comprises a row of bogie rollers engaged with the interior surface of the track and coupled to the corresponding side of the frame and recessed, from an outer edge of the track and in the lateral direction, to be flush with the drive pulley.

11. The unmanned ground vehicle of claim 1, comprising right and left flippers extending beyond a front end of the frame, each of the right and left flippers comprising a driven flipper track trained about a flipper drive pulley, the driven flipper tracks each comprising a flipper belt and an additional plurality of flexible bristles.

12. The unmanned ground vehicle of claim 11, wherein each of the right and left flippers are pivotally coupled to the unmanned ground vehicle, and wherein the unmanned ground vehicle comprises one or more flipper drive motors to drive the flipper drive pulleys and pivot the right and left flippers about a drive axis of the drive pulleys.

13. The unmanned ground vehicle of claim 12, comprising a controller programmed to execute an obstacle surmounting routine and control the one or more drive motors and the one or more flipper drive motors to cause the unmanned ground vehicle to surmount an obstacle using friction between a subset of the plurality of flexible bristles and the obstacle.

14. The unmanned ground vehicle of claim 13, wherein the obstacle surmounting routine is a stair climbing routine and the controller, in executing the stair climbing routine, causes the unmanned ground vehicle to approach, using the one or more drive motors, a stair; contact, using the one or more drive motors and the one or more flipper drive motors, the stair; and surmount the stair by driving the one or more drive motors or the one or more flipper drive motors or both to generate traction between the subset of the plurality of flexible bristles and the stair.

15. An unmanned ground vehicle comprising:
   a frame having right and left sides;
   right and left track assemblies, each track assembly being coupled to a corresponding side of the frame in parallel with the other track assembly, each track assembly comprising:
      a drive pulley coupled to the corresponding side of the frame; and
      a track comprising a continuous flexible belt supported by the drive pulley, wherein the track comprises an interior surface engaged with the drive pulley and an exterior surface opposite the interior surface, and wherein the exterior surface of the track comprises a plurality of flexible vanes; and one or more drive motors configured to drive the drive pulleys of the right and left track assemblies;

wherein each track has a track width in a lateral direction extending between the right and left sides, and wherein, for each track, the flexible vanes on the track extend away from the exterior surface of the track and each comprise an exterior edge opposite the exterior surface of the track;

wherein, for each track, each flexible vane extends from a left edge of the track to a right edge of the track in the lateral direction; and wherein, for each flexible vane of each track, the exterior edge opposite the exterior surface of the track is undulated and follows a pattern that rises to right and left peaks from the right and left edges of the track.

16. The unmanned ground vehicle of claim 15, wherein, for each flexible vane of each track, the exterior edge opposite the exterior surface of the track is straight along the lateral direction.

17. The unmanned ground vehicle of claim 15, wherein each flexible vane comprises a molded thermoplastic or thermoset elastomer material.

18. The unmanned ground vehicle of claim 15, comprising a controller programmed to execute an obstacle surmounting routine and control the one or more drive motors to cause the unmanned ground vehicle to surmount an obstacle using friction between a subset of the flexible vanes and the obstacle.

19. The unmanned ground vehicle of claim 18, wherein the obstacle surmounting routine is a fiber optic cable navigation routine and the controller, in executing the fiber optic cable navigation routine, causes the unmanned ground vehicle to drive over at least one length of fiber optic cable laying along a lateral direction so that the at least one length of fiber optic cable fits within a gap between two neighboring flexible vanes as the unmanned ground vehicle drives over the at least one length of fiber optic cable.

20. The unmanned ground vehicle of claim 18, comprising:

right and left flippers extending beyond a front end of the frame, each of the right and left flippers comprising a driven flipper track trained about a flipper drive pulley, the driven flipper tracks each comprising a flipper belt and an additional plurality of flexible vanes, wherein each of the right and left flippers are pivotally coupled to the unmanned ground vehicle; and one or more flipper drive motors to drive the flipper drive pulleys and pivot the right and left flippers about a drive axis of the drive pulleys;

wherein the obstacle surmounting routine is a stair climbing routine and the controller, in executing the stair climbing routine, causes the unmanned ground vehicle to approach, using the one or more drive motors, a stair; contact, using the one or more drive motors and the one or more flipper drive motors, the stair; and surmount the stair by driving the one or more drive motors or the one or more flipper drive motors or both to generate traction between the subset of the plurality of flexible vanes and the stair.

21. The unmanned ground vehicle of claim 15, wherein, for each track, the flexible vanes are spaced apart densely so that a distance between flexible vanes is less than a track width of the track in a lateral direction extending between the right and left sides.

22. An unmanned ground vehicle comprising:

a frame having right and left sides;

right and left track assemblies, each track assembly being coupled to a corresponding side of the frame in parallel with the other track assembly, each track assembly comprising:

a drive pulley coupled to the corresponding side of the frame; and a track comprising a continuous flexible belt supported by the drive pulley, wherein the track comprises an interior surface engaged with the drive pulley and an exterior surface opposite the interior surface, and wherein the exterior surface of the track comprises a plurality of flexible vanes; and one or more drive motors configured to drive the drive pulleys of the right and left track assemblies;

wherein each track has a track width in a lateral direction extending between the right and left sides, and wherein, for each track, the flexible vanes on the track extend away from the exterior surface of the track and each comprise an exterior edge opposite the exterior surface of the track, and wherein, for each track, each flexible vane extends from a left edge of the track to a right edge of the track in the lateral direction;

wherein, for each flexible vane of each track, the flexible vane tapers from a base of the flexible vane to a tip of the flexible vane on the exterior edge, and wherein a ratio between a height of the flexible vane to a thickness of the flexible vane in a longitudinal direction perpendicular to the lateral direction is between 20:1 and 8:1.

23. A method for controlling an unmanned ground vehicle to surmount an obstacle, the method comprising:

approaching, by a controller sending control signals to one or more drive motors, the obstacle, wherein the unmanned ground vehicle comprises right and left track assemblies, each track assembly comprising a drive pulley driven by one of the one or more drive motors and a track comprising a continuous flexible belt supported by the drive pulley, wherein the track comprises an interior surface engaged with the drive pulley and an exterior surface opposite the interior surface, and wherein the exterior surface of the track comprises a plurality of flexible bristles or vanes, wherein each track has a track width in a lateral direction extending between right and left sides of the unmanned ground vehicle, and wherein, for each track, the exterior surface of the track comprises a plurality of rows of flexible bristles each extending across the track width in the lateral direction, and wherein, for each row of flexible bristles, a height of the flexible bristles tapers from a center of the row to left and right edges of the row; and contacting, by the controller sending the control signals to the one or more drive motors and one or more flipper drive motors, the obstacle, wherein the unmanned ground vehicle comprises right and left flippers, each of the right and left flippers comprising a driven flipper track trained about a flipper drive pulley driven by the one or more flipper drive motors; and surmounting the obstacle by driving the one or more drive motors or the one or more flipper drive motors or both to generate traction between the obstacle and a subset of the plurality of flexible bristles or the plurality of flexible vanes.

* * * * *